Nov. 13, 1956 — M. H. REDMER — 2,770,461
CHUCK
Filed Feb. 21, 1956 — 3 Sheets-Sheet 1
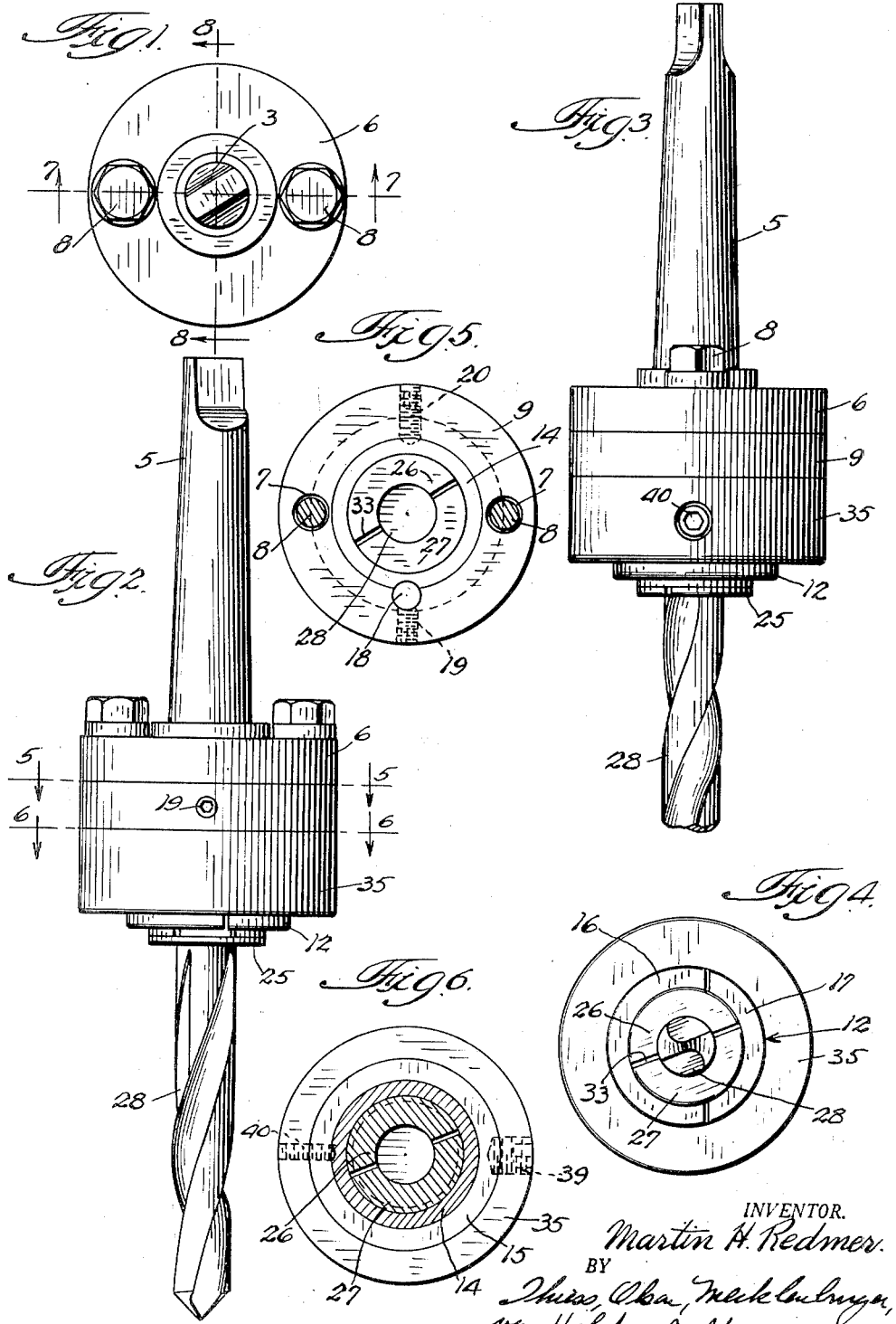
INVENTOR.
Martin H. Redmer.

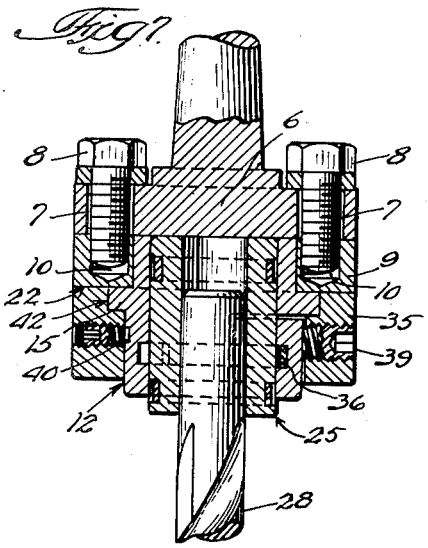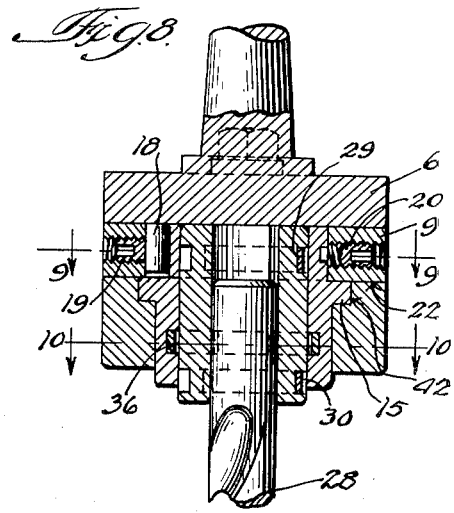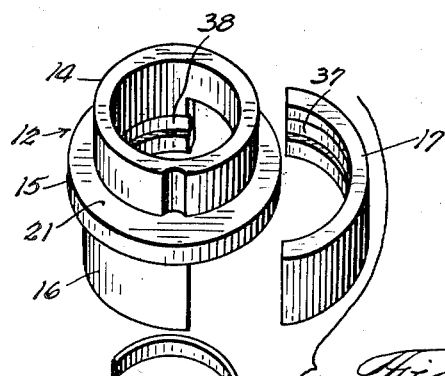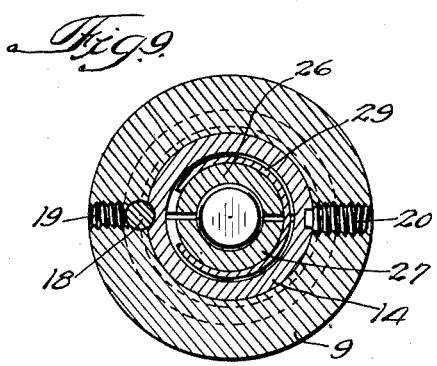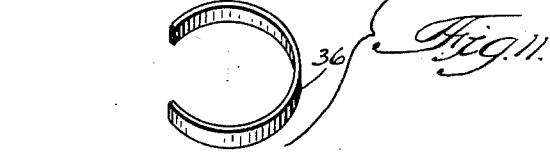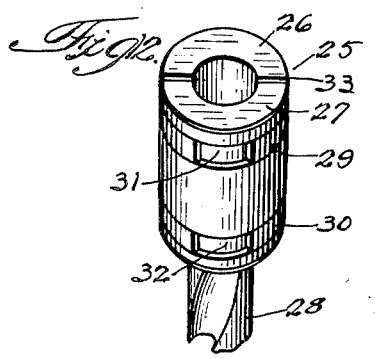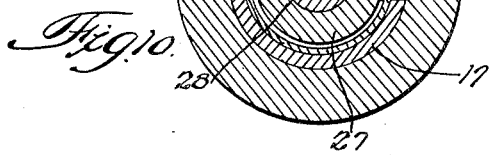
INVENTOR.
Martin H. Redmer.

Nov. 13, 1956 — M. H. REDMER — 2,770,461
CHUCK
Filed Feb. 21, 1956 — 3 Sheets-Sheet 3
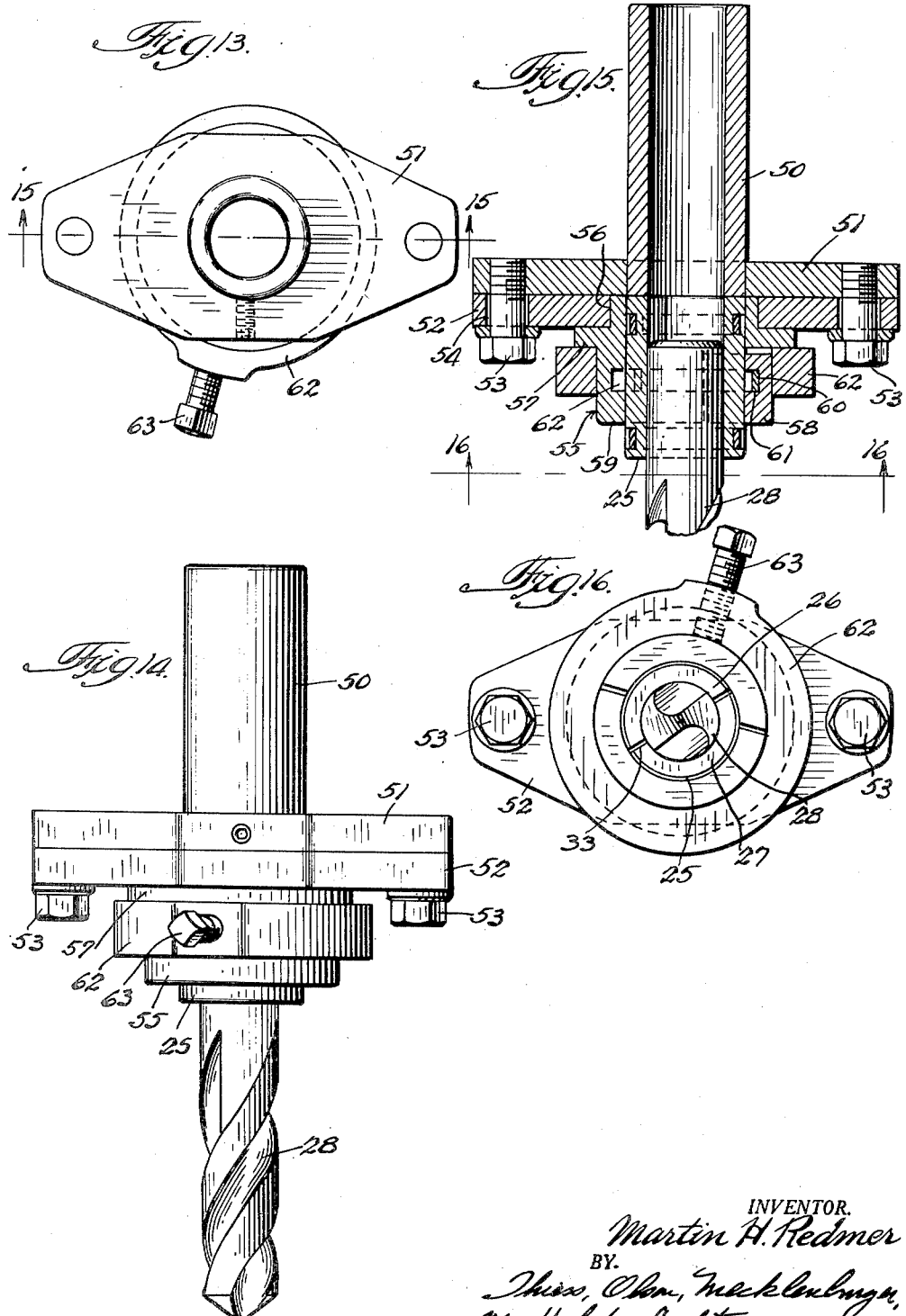
INVENTOR.
Martin H. Redmer

2,770,461

CHUCK

Martin H. Redmer, Chicago, Ill.

Application February 21, 1956, Serial No. 566,887

5 Claims. (Cl. 279—55)

This invention relates to a floating drill holder and drill bushing for automatic screw machines, turret lathes, lathes and drill presses.

Drill holders for automatic screw machines and turret lathes have heretofore been constructed with such parts as the bushing socket, hub plate, shank, shank plate and set screw formed as an integral structure so that if any of these parts become distorted or the threads stripped or the set screw twisted off, the entire structure must be replaced. If the set screw is twisted off while the drill or tool is clamped in the bushing, it is necessary to use force to release the bushing. This often causes the drill or tool to be broken and the holder to be distorted.

It is an object of the invention to provide an improved floating drill holder and drill bushing having all of the component parts made separate whereby the breakage or distortion of any part will not necessitate the replacement of more than the broken or distorted part.

A still further object of the invention is to provide a floating drill holder and drill bushing of this type having its parts easily assembled so that a change in size of drill or tool may be made in minimum time and with minimum effort.

A still further object of the invention is to provide a floating drill holder and drill bushing of the aforesaid characteristics which is simple, inexpensive to manufacture, easy to handle and capable of quick and easy replacement not only of a broken or distorted part, but also of a new drill or tool whether the change of the tool be one of size or replacement.

A still further object of the invention is to provide a floating drill holder and drill bushing having a two-part drill or tool bushing adapted to be held clamped about the drill or tool by removable spring bands, a two-part holder for the bushing having a spring band tending to separate the two parts, and a hub yoke to clamp the holder parts together about the drill bushing by means of a set screw. The spring band of the two-part holder causes ready separation of these parts and prevents any binding heretofore experienced in drill holders of the prior art.

It is desirable for a floating drill holder and drill bushing to align the drill or tool with the center of the machine spindle or the center of the work caused by misalignment of the turret with the center of the work. The device embodying the present invention, as disclosed herein, permits a simple alignment being made by the loosening of the cap screws of the hub plate, then allowing the drill or tool to find its own center with the work, and then tightening the screws again.

Further objects and advantages of the invention will be apparent from the following detailed description when taken in connection with the accompanying drawings which form a part thereof.

Figure 1 is a top view of one form of drill holder and drill bushing assembly embodying the present invention;

Fig. 2 is a side elevational view of the unit shown in Fig. 1;

Fig. 3 is also a side elevational view of the view shown in Fig. 1 but taken at right angles to Fig. 2;

Fig. 4 is a view similar to Fig. 1 but looking at the opposite end carrying the drill or work;

Fig. 5 is a transverse sectional view taken along line 5—5 of Fig. 2 and looking in the direction of the arrows;

Fig. 6 is a transverse sectional view taken along line 6—6 of Fig. 2 and looking in the direction of the arrows;

Fig. 7 is a sectional view taken along line 7—7 of Fig. 1 and looking in the direction of the arrows;

Fig. 8 is also a transverse section but taken along line 8—8 of Fig. 1 and looking in the direction of the arrows;

Fig. 9 is a transverse section taken along line 9—9 of Fig. 8;

Fig. 10 is a transverse section taken along line 10—10 of Fig. 8;

Fig. 11 is an exploded view of the parts comprising the hub or drill holder;

Fig. 12 is a perspective view of the drill bushing;

Fig. 13 is an end view of a modified form of unit embodying the present invention;

Fig. 14 is a side elevational view of the same;

Fig. 15 is a transverse sectional view taken along line 15—15 of Fig. 13, looking in the direction of the arrows; and Fig. 16 is an end view of the same looking in the direction of the arrows of line 16—16 shown in Fig. 15.

Referring more particularly to the drawings, the tapered shank 5 is adapted to be received by the usual holder (not shown) provided for the same on automatic screw machines and turret lathes and may be formed integral, if so desired, with shank plate 6 having both openings 7 slightly larger than the diameter of threaded bolts 8, which are designed to clamp the shank plate to a hub plate 9. Hub plate 9 is therefore provided with threaded openings 10 to receive bolts 8 in a floating relation presently to be described.

A hub 12 illustrated in an exploded view in Fig. 11 comprises a collar 14, shoulder 15 and part 16, all as an integral piece but with a removable segment 17 which in fact is a part of portion 16 but is carried in split relation. Collar 14 has a drive fit in hub plate 9 and is positively held against relative rotation therewith by a key 18 locked against displacement by a socket set screw 19 shown in Fig. 8. Relative rotation between hub plate 9 and collar 14 is further prevented by a second socket set screw 20 arranged diametrically opposite socket set screw 19. Shoulder 15 is provided with a flat surface 21 adapted to rest or abut against surface 22 of hub plate 9.

A split tool bushing 25 comprising parts 26 and 27 is adapted to receive a drill or tool 28, the parts 26 and 27 being normally held together by spring bands 29 and 30 adapted to be fitted in grooves 31 and 32 formed at opposite ends in the outer face of parts 26 and 27. The cut 33 that splits bushing 25 into two parts is of such size that when drill 28 is inserted, the outer peripheral spring bands 29 and 30 will press these parts 26 and 27 together with sufficient pressure to keep these parts tightly against the shank of drill 28. One of the advantages of the present arrangement, as will be apparent from the disclosure herein, is that a set of bushings 25 corresponding in size to a set of drills will effect substantial savings in shop time in the changing of drills if these bushings are kept mounted upon the drills and held in readiness in this manner for use as changes in size are required.

As will be apparent in Figs. 7 to 12, inclusive, bushing 25 is adapted to be inserted in the holder or hub 12 and held therein by a hub yoke 35 which slides over portion 16 and segment 17 when in position about the drill bushing 25, as illustrated in Figs. 7 and 8. Segment 17 normally tends to keep spread away from portion 16 by an internally disposed spring band 36 located when the parts are assembled in an interior recess 37 formed in segment 17 and recess 38 formed in portion 16. A socket set screw 39 is arranged to engage segment 17 and press it tightly against bushing 25 against the action of spring band 36. On the opposite side of hub yoke 35 is a second socket set screw 40 similarly serving to engage portion 16 of the holder or hub 12 whereby to apply sufficient pressure against split bushing 25 to not only hold this split bushing 25 but also the drill 28 tightly in the assembly, drill 28 being sufficiently gripped thereby without requiring a set screw to engage the same in order to hold it in position in its bushing during use thereof. Hub yoke 35 is recessed at 42 so that shoulder 15 will seat therein. Thus, socket set screws 39 and 40 act to compress spring 36 and to hold parts 16 and 17 tightly against drill bushing 25.

When drill bushing 25 is to be removed, internal spring 36 forces segment 17 away from drill bushing 25 so as to allow it to drop out of the hub or holder 12 after yoke 35 is removed. It is impossible for a split bushing 25 to become bound in holder 12 so as to require force to free it. It will drop freely out of holder 12. Also, hub yoke 35 is assembled in a manner preventing it from being bound or distorted in a manner to prevent its easy removal. It too will drop freely from its position about the lower portion of holder 12, the action of spring band 36 tending to assist in freeing hub yoke 35 when socket set screws 39 and 40 are loosened. The hub plate 9, hub or holder 12 and the hub yoke 35 are securely or firmly assembled as a unit without set screws engaging either the split bushing 25 or drill 28. This assembled unit is held to the shank plate by bolts 8, which, due to the enlarged diameter of holes 7, permit a floating arrangement that allows aligning of the drill or tool to the center of the work whereupon tightening of bolts 8 will hold the assembled unit with its drill 28 in properly aligned position.

An embodiment of the invention applicable to automatic screw machines is illustrated in Figs. 13 to 16, inclusive. Instead of tapered shank 5 being formed integral with plate 6, a sleeve 50 is secured by a pressed fit to plate 51. A hub plate 52 is bolted to plate 51 by bolts 53. In this embodiment, the bolts 53 thread into plate 51 and openings 54 in plate 52 are larger in diameter than the diameter of bolts 53 so that the same floating action to permit alignment of the drill with the work can be readily obtained.

Hub 55 is similar in construction, the collar 56 being seated in hub plate 52 by a drive fit. Shoulder 57 abuts against the front face of hub plate 52. Segment 58 is likewise split from portion 59, and spring band 60 seated in inner recesses 61 and 62 tends to hold segment 58 away from portion 59. However, the action of spring 60 is overcome by a hub yoke 62 similar to hub yoke 35. Instead of socket set screws 39 and 40, a square-headed set screw 63 may be used to secure hub yoke 62 tightly about the hub 55 to hold both portions 58 and 59 firmly about split bushing 25 that receives the drill or tool 28. In both embodiments, split bushing 25 may be of the same construction. Again, the parts comprising the unit may be assembled in a manner that will hold the drill or tool 28 firmly in position but may readily be dismantled by unthreading set screw 63. Here again the desirable feature of not engaging either the drill or the drill bushing by a set screw is present.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A chuck comprising a shank plate, a hub plate, means for bolting said hub plate to said shank plate, a hub seated in said hub plate, a split tool bushing in said hub, said hub having a removable segment and a spring band urging said removable segment away from said bushing, a yoke member for clamping about said hub to hold said removable segment in position against said bushing, and means carried by said yoke for applying clamping pressure by said hub and its removable segment against said bushing.

2. A chuck comprising a shank plate, a hub plate, means for adjustably attaching said hub plate to said shank plate, a hub carried by said hub plate, a split tool bushing insertible in said hub, said hub having a removable segment and a spring band urging said removable segment away from said bushing, a yoke member for clamping about said hub to hold said removable segment in position against said bushing, and means carried by said yoke for applying clamping pressure by said hub and its removable segment against said bushing.

3. A chuck comprising a shank plate, a hub plate, means for adjustably attaching said hub plate to said shank plate, a hub carried by said hub plate, a split tool bushing insertible in said hub, spring bands for urging said split bushing against a tool carried therein, said hub having a removable segment, a yoke member for clamping about said hub to hold said removable segment in position against said bushing, and means carried by said yoke for applying clamping pressure by said hub and its removable segment against said bushing.

4. A chuck comprising a mounting, a hub plate attached to said mounting, a hub carried by said hub plate, a split tool bushing insertible in said hub, spring bands for urging said split bushing against a tool carried therein, said hub having a removable segment, a yoke member for clamping about said hub to hold said removable segment in position against said bushing, and means carried by said yoke for applying pressure by said hub and its removable segment against said bushing and the tool carried therein.

5. A chuck comprising a mounting, a hub plate carried by said mounting, a hub carried by said hub plate, a two-part tool bushing insertible in said hub, said parts having outer peripheral grooves therein, removable spring bands in said grooves for urging said parts together whereby to grip a tool carried therein, said hub having a removable segment forming a portion of its outer wall, a yoke member for clamping about said hub to hold said removable segment in position against said bushing parts, and means carried by said yoke for applying pressure by said hub and its removable segment against said bushing and the tool carried therein.

No references cited.